July 19, 1927.

C. M. STEMEN 1,636,199

SANITARY MILK PAIL COVER

Filed Dec. 30, 1925

Charles M. Stemen
INVENTOR.

BY
ATTORNEYS.

Patented July 19, 1927.

1,636,195

UNITED STATES PATENT OFFICE.

CHARLES M. STEMEN, OF JOHNSTOWN, OHIO.

SANITARY MILK-PAIL COVER.

Application filed December 30, 1925. Serial No. 78,285.

My invention relates to a sanitary milk pail cover and, more particularly, to a cover used on a milk pail while milking.

One of the objects of my invention is the provision of a cover for a milk pail which is so designed as to reduce to a minimum the danger of dirt, flies, et cetera, getting into the pail while milking and until the milk is poured from the pail into a milk can or other similar receptacle.

Another object of my invention is to provide a cover for use with a milk pail, such cover being of simple construction and cheap to manufacture, and comprising a small number of parts, whereby upkeep and repair are reduced to a minimum.

A further object of my invention is the provision of a cover for a milk pail wherein the cover is easy to take apart and cleanse.

Various other features of my invention will be apparent as this description progresses.

The various objects of my invention are preferably obtained by the structure illustrated in the drawings wherein similar characters of reference designate corresponding parts and wherein.

Figure 1:
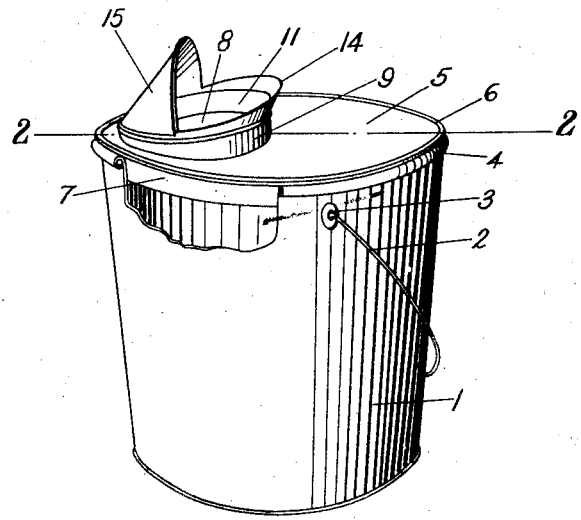
Figure 1 is a perspective view of a milk pail with parts cut away showing my improved cover mounted thereon.
Figure 2:
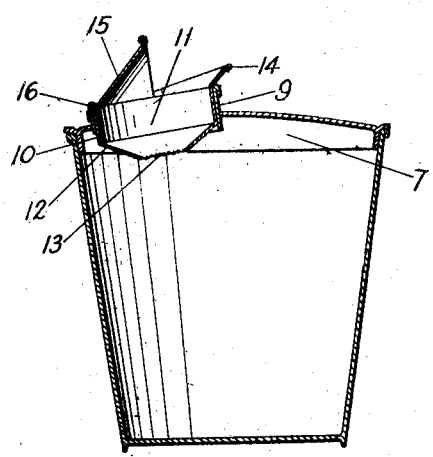
Figure 2 is a vertical section taken on line 2—2 of Figure 1.
Figure 3:
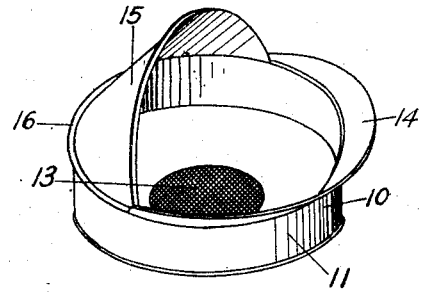
Figure 3 is an enlarged perspective view of the shield shown in Figure 1.

With reference to the drawings, the numeral 1 represents a milk pail of ordinary construction which I have chosen in order to illustrate my invention. The pail 1 has a bail 2 connected thereto by means of the fasteners 3. The milk pail 1 is provided at its upper portion with a rim 4.

In the practical embodiment of my invention, I provide a cover 5 with a convex surface and an annular flange 6 around the outer edge thereof adapted to rest upon the upper edge of the pail 1. The cover 5 has an annular depending flange 7 carried thereby and adapted to fit inside of the top portion of the pail 1. The cover 5 is retained upon the pail 1 by means of frictional contact between the annular depending flange 7 of the cover 5 and the top of the pail 1 or by any other well-known method. The convex surface of the cover 5 is provided with an eccentrically positioned opening 8 with a surrounding collar 9 designed to extend upwardly at an angle to the cover. The upstanding collar 9 is adapted to receive a shield 10.

The shield 10 has a body portion 11 which is cylindrical in form and adapted to fit in the opening of the cover 5. Extending downwardly from the body portion 11 and integral therewith is an inwardly tapered flange 12. The tapered flange 12 is provided at the base thereof with a wire screening or other foraminous material 13 that obviously reduces to a minimum the inlet of dirt, flies or other foreign matter into the pail.

The cylindrical body portion 11 of the shield 10 is provided with a lip 14, which is integral with the shield 10 and extends outwardly at an angle therefrom. By positioning the lip 14 at an angle to the shield 10, it will be obvious that the milk coming into contact with the lip 14 will be directed into the interior of the shield. The shield 10 is also provided with a guard 15. The deflector 15 is integral with the shield 10 and extends toward the center of said shield. The guard 15 extends out over the open top of the shield 10 to reduce to a minimum the danger of dirt or other objects from coming in contact with the milk. It is also obvious that by positioning the guard 15 as above described, the milk coming in contact with the interior of the guard will be directed into the milk pail and splashing avoided.

The shield 10 is also provided with a flange 16 at the intersection of the deflector 15 with the body portion 11. The object of the flange 16 is that it provides means for holding and supporting the shield 10 in the opening 8 of the cover. It will also be seen that by providing a shield of such construction, the shield can easily be taken out of the cover for cleaning it at any desired time.

It will be noted that I have provided a novel and simple cover, which is so designed as to reduce to a minimum the danger of dirt and other objects getting into the milk in a milk pail, with a consequent reduction of harmful bacterial content.

It will further be noted that I have provided a cover of such construction as to prevent the splashing of the milk from the pail in transportation and to provide an opening in the cover for ventilating and allowing the escape of vaporous impurities arising from the milk.

Having thus described my invention what I claim is:

In a milking pail having a cover provided with a convex top and the usual inlet opening, a unitary attachment removably mounted in said opening, said attachment comprising a collar to fit said opening having at its upper end a lip and a shield, and at its lower end a downwardly dished annulus having a strainer attached to the lower end thereof.

In testimony whereof I hereby affix my signature.

CHARLES M. STEMEN.